(12) United States Patent
Shanmugaraju et al.

(10) Patent No.: US 10,405,344 B2
(45) Date of Patent: Sep. 3, 2019

(54) ZONE-BASED HOMING AND SCHEDULING FOR CENTRALIZED RADIO ACCESS NETWORK (C-RAN) SYSTEM WITH A CLUSTER OF BASEBAND UNITS

(71) Applicant: CommScope Technologies LLC, Hickory, NC (US)

(72) Inventors: Naveen Shanmugaraju, Chennai (IN); Anil Bapat, Bangalore (IN); Pavani Palukuri, Bangalore (IN); Paresh Pednekar, Bangalore (IN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/974,603

(22) Filed: May 8, 2018

(65) Prior Publication Data

US 2018/0332614 A1 Nov. 15, 2018

Related U.S. Application Data

(60) Provisional application No. 62/503,612, filed on May 9, 2017.

(51) Int. Cl.
| | |
|---|---|
| *H04W 4/00* | (2018.01) |
| *H04W 74/04* | (2009.01) |
| *H04W 88/12* | (2009.01) |
| *H04W 88/08* | (2009.01) |
| *H04W 76/27* | (2018.01) |
| *H04W 28/08* | (2009.01) |
| *H04W 88/16* | (2009.01) |
| *H04W 76/10* | (2018.01) |

(52) U.S. Cl.
CPC ............ *H04W 74/04* (2013.01); *H04W 28/08* (2013.01); *H04W 76/27* (2018.02); *H04W 88/085* (2013.01); *H04W 88/12* (2013.01); *H04W 88/16* (2013.01); *H04W 76/10* (2018.02)

(58) Field of Classification Search
CPC ..... H04W 28/08; H04W 74/04; H04W 76/10; H04W 76/27; H04W 88/085; H04W 88/12; H04W 88/16
See application file for complete search history.

(56) References Cited

U.S. PATENT DOCUMENTS

| | | | |
|---|---|---|---|
| 9,380,466 B2 | 6/2016 | Eyuboglu et al. | |
| 9,414,399 B2 | 8/2016 | Eyuboglu et al. | |
| 9,936,470 B2 | 4/2018 | Eyuboglu et al. | |

(Continued)

FOREIGN PATENT DOCUMENTS

| | | |
|---|---|---|
| KR | 101529447 B1 | 6/2015 |
| KR | 20170028984 A | 3/2017 |

(Continued)

OTHER PUBLICATIONS

International Search Authority, International Search Report and Written Opinion for PCT/US20181031684 dated Aug. 31, 2018, "from Foreign Counterpart of U.S. Appl. No. 15/974,603", dated Aug. 31, 2018, pp. 1-10, Published in: WO.

*Primary Examiner* — Minh Trang T Nguyen
(74) *Attorney, Agent, or Firm* — Fogg & Powers LLC

(57) ABSTRACT

One embodiment is directed to zone-based homing and scheduling techniques for a centralized radio access network (C-RAN) system with a cluster of baseband units.

24 Claims, 7 Drawing Sheets

(56) References Cited

U.S. PATENT DOCUMENTS

| | | | |
|---|---|---|---|
| 2013/0272213 A1* | 10/2013 | Manssour | H04W 72/121 |
| | | | 370/329 |
| 2014/0031049 A1* | 1/2014 | Sundaresan | H04W 16/02 |
| | | | 455/447 |
| 2016/0037550 A1 | 2/2016 | Barabell et al. | |
| 2016/0242147 A1 | 8/2016 | Tarlazzi et al. | |
| 2017/0127411 A1* | 5/2017 | Miao | H04L 27/2607 |
| 2017/0318605 A1* | 11/2017 | Wijetunge | H04W 16/32 |

FOREIGN PATENT DOCUMENTS

| | | |
|---|---|---|
| WO | 2016074702 A1 | 5/2016 |
| WO | 2017005321 A1 | 1/2017 |
| WO | 2017100096 A1 | 6/2017 |

* cited by examiner

ZONE-BASED HOMING AND SCHEDULING FOR CENTRALIZED RADIO ACCESS NETWORK (C-RAN) SYSTEM WITH A CLUSTER OF BASEBAND UNITS

CROSS-REFERENCE TO RELATED APPLICATION

This application claims the benefit of U.S. Provisional Patent Application Ser. No. 62/503,612, filed on May 9, 2017, which is hereby incorporated herein by reference.

BACKGROUND

A centralized radio access network (C-RAN) is one way to implement base station functionality. Typically, for each cell implemented by the C-RAN, a single baseband unit (BBU) interacts with multiple remote units (also referred to here as "radio points" or "RPs").

Although a C-RAN may be used to implement multiple cells, each cell typically includes only a single BBU that implements hosting for the cell (for example, the attach procedure and control-plane termination from the core network), homing for user equipment (UE) (for example, UE context management and user-plane functions), and scheduling and resource allocation.

Typically, there is a limit to the number of UEs that can be served by a given BBU. Additional BBU capacity can be provided by adding additional cells to the C-RAN. However, doing this can result in poor performance at the edges of the cells due to interference. Also, doing this requires handovers to occur as a UE moves from one cell to another, which can lead to delays and/or loss of radio connections.

SUMMARY

One embodiment is directed to a system to provide wireless service. The system comprises a baseband controller cluster and a plurality of radio points. The baseband controller cluster and the plurality of radio points implement a base station to provide wireless service to a plurality of user equipment (UEs) using a common cell. The baseband controller cluster is communicatively coupled to a core network of a wireless service provider. The baseband controller cluster comprising a plurality of baseband controllers. The radio points are configured to transmit and receive radio frequency signals to and from the UEs, each of the radio points associated with at least one antenna and remotely located from the baseband controllers cluster. The plurality of radio points is communicatively coupled to the baseband controller cluster. The common cell is divided into a plurality of zones. Each of the zones is associated with a respective one of the baseband controllers. One of the baseband controllers is designated as a cell manager. The cell manager is configured to, for each UE served by the cell, assign one of the baseband controllers to which that UE is homed. The baseband controller to which each UE is homed does not change as the UE moves throughout the cell. The cell manager is configured to, for each UE served by the cell, host a respective control-plane connection with a core network such that the home controller for that UE communicates control-plane messages with the core network via the cell manager. Each home controller is configured to, for each UE that the home controller serves as the home controller for, host a respective user-plane connection with the core network so that each home controller communicates user-plane messages with the core network over the respective user-plane connection. The system is configured to select some of the UEs served by the cell to schedule during each current transmission time interval (TTI). The system is configured to classify each selected UE into one of the zones as a current zone in which that selected UE is currently located. The system is configured so that, for each selected UE, the baseband controller assigned to the current zone of that selected UE serves as a scheduling controller for that scheduled UE. The system is configured to determine, for each selected UE, which radio points in the current simulcast group associated with that selected UE are border radio points located outside of the current zone for that selected UE. The system is configured to, for each border radio point, determine a split of radio resources of the current TTI for that radio point among the scheduling controllers for the selected UEs that have that border radio point in the current simulcast groups thereof. Each scheduling controller independently allocates radio resources to the selected UEs for which that scheduling controller serves as the scheduling controller while respecting any splits of radio resources that apply to that controller.

Another embodiment is directed to a method of providing wireless service using a baseband controller cluster and a plurality of radio points. The baseband controller cluster and the plurality of radio points implement a base station to provide wireless service to a plurality of user equipment (UEs) using a common cell. The baseband controller cluster is communicatively coupled to a core network of a wireless service provider. The baseband controller cluster comprises a plurality of baseband controllers. The radio points are configured to transmit and receive radio frequency signals to and from the UEs. Each of the radio points is associated with at least one antenna and remotely located from the baseband controller cluster. The plurality of radio points is communicatively coupled to the baseband controller cluster. The common cell is divided into a plurality of zones. The method comprises associating each of the zones with a respective one of the baseband controllers and designating one of the baseband controllers as a cell manager for the cell. The method further comprises, for each UE served by the cell, assigning one of the baseband controllers to serve as a home controller for that UE. The home controller for each UE does not change as the UE moves throughout the cell. The method further comprises hosting by the cell manager, for each UE served by the cell, a respective control-plane connection with a core network, communicating control-plane messages for each UE between the core network and the home controller for that UE via the cell manager, hosting by each home controller a respective user-plane connection with the core network for each UE that the home controller serves as the home controller for, and communicating user-plane messages for each UE between the core network and the home controller for that UE over the respective user-plane connection. The method further comprises, for each current transmission time interval (TTI): selecting some of the UEs served by the cell to schedule during a current transmission time interval (TTI), classifying each selected UE into one of the zones as a current zone in which that selected UE is currently located, selecting the baseband controller assigned to the current zone of that selected UE to serve as a scheduling controller for that scheduled UE, determining, for each selected UE, which radio points in the current simulcast group associated with that selected UE are border radio points located outside of the current zone for that selected UE, for each border radio point, determining a split of radio resources of the current TTI for that radio point among the scheduling controllers for the selected UEs that have that border radio point in the current simulcast groups for those selected UEs, and independently allocating, by each scheduling controller, radio resources to the selected UEs for which that scheduling controller serves as the scheduling controller while respecting any splits of radio resources that apply to that scheduling controller.

Other embodiments are disclosed.

The details of various embodiments are set forth in the accompanying drawings and the description below. Other features and advantages will become apparent from the description, the drawings, and the claims.

DRAWINGS

FIG. 1 is a block diagram illustrating one exemplary embodiment of a radio access network (RAN) system in which the baseband controller clustering techniques described here can be implemented.

FIG. 2 comprises a flow chart illustrating one exemplary embodiment of a method of performing UE homing in a C-RAN having multiple baseband units that serve a single cell.

Figure 6:
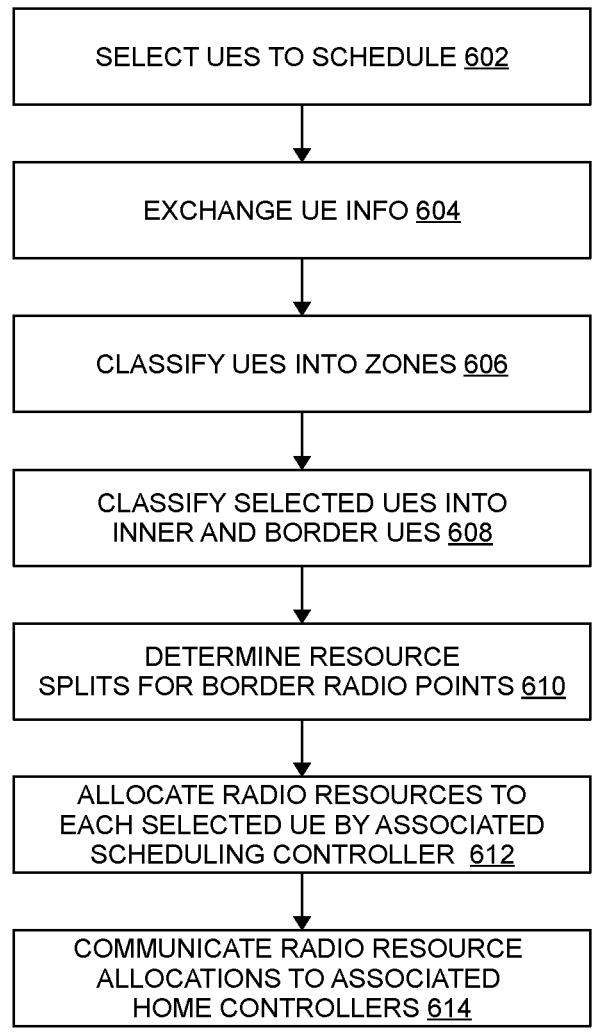

FIG. 6 comprises a flow chart illustrating one exemplary embodiment of a method of performing distributed scheduling in a C-RAN having multiple baseband units that serve a single cell.

Figure 7:
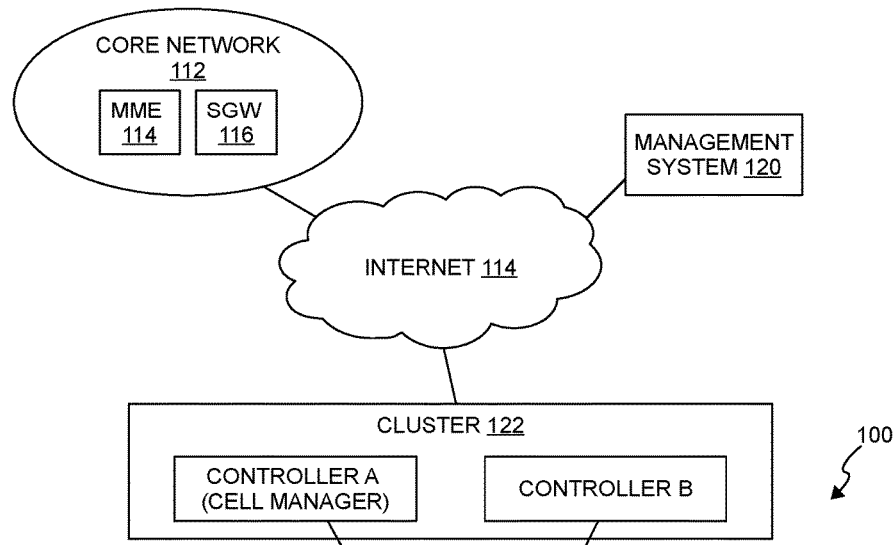
Figure 7:
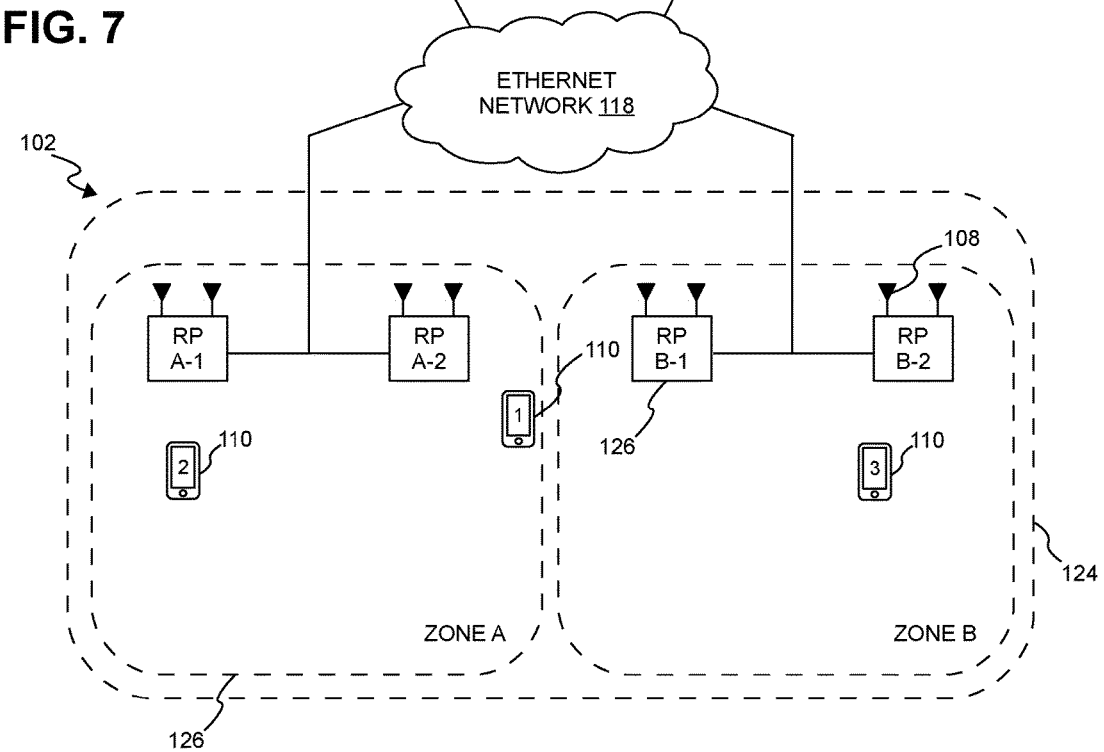

FIG. 7 illustrates one example of the operation of the method of FIG. 6.

Like reference numbers and designations in the various drawings indicate like elements.

DETAILED DESCRIPTION

Figure 1:
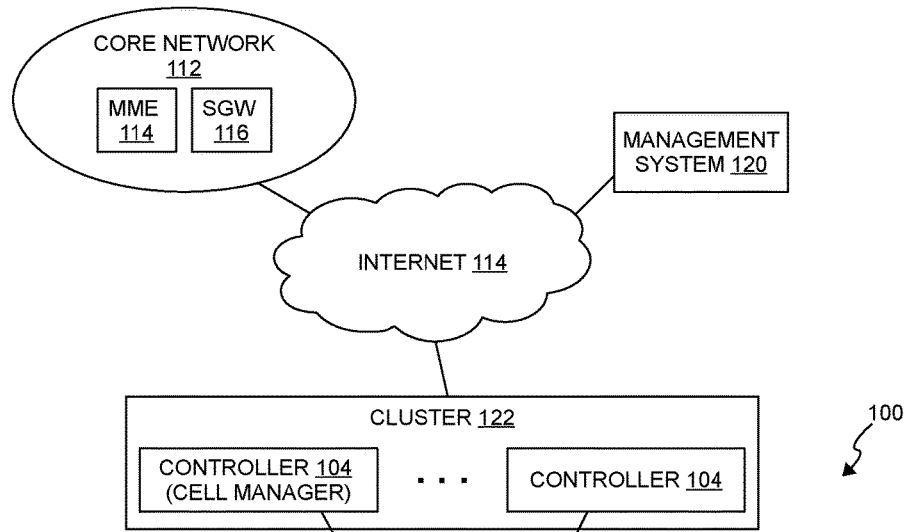
Figure 1:
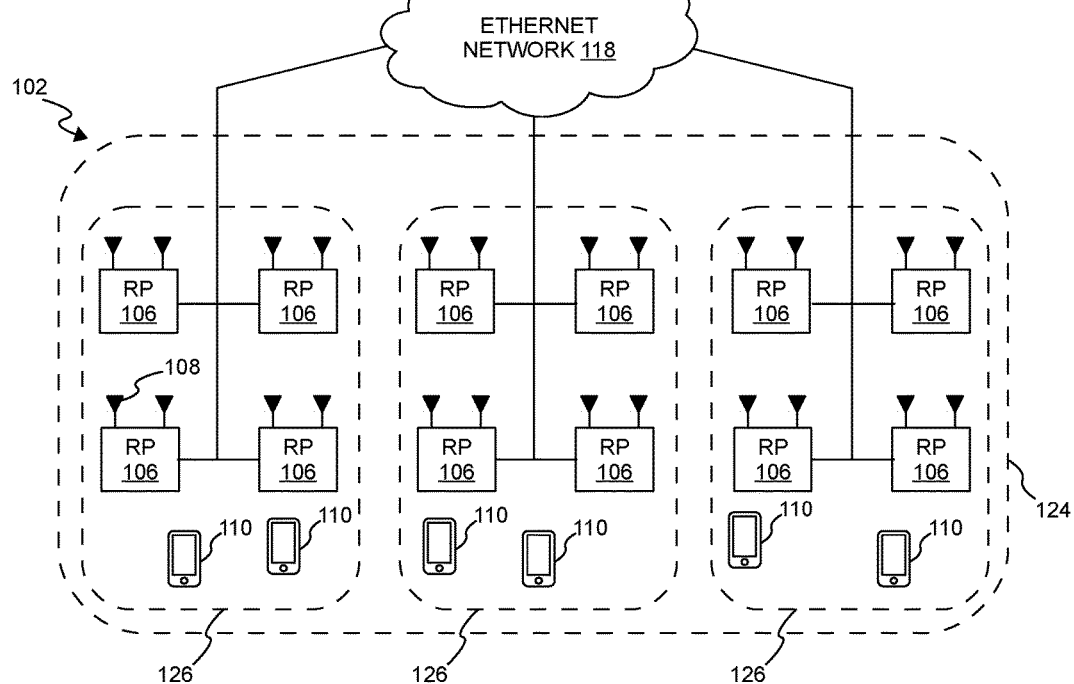

FIG. 1 is a block diagram illustrating one exemplary embodiment of a radio access network (RAN) system 100 in which the baseband controller clustering techniques described here can be implemented. The system 100 is deployed at a site 102 to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area).

In the exemplary embodiment shown in FIG. 1, the system 100 is implemented at least in part using a C-RAN (point-to-multipoint distributed base station) architecture that employs at least one baseband unit 104 and multiple radio points (RPs) 106. The system 100 is also referred to here as a "C-RAN system" 100. The baseband controllers 104 are also referred to here as "baseband controllers" 104 or just "controllers" 104. Each RP 106 includes or is coupled to one or more antennas 108 via which downlink RF signals are radiated to user equipment (UE) 110 and via which uplink RF signals transmitted by UEs 110 are received.

More specifically, in the example shown in FIG. 1, each RP 106 comprises two antennas 108. Each RP 106 can include or be coupled to a different number of antennas 108.

The system 100 is coupled to the core network 112 of each wireless network operator over an appropriate back-haul. In the exemplary embodiment shown in FIG. 1, the Internet 114 is used for back-haul between the system 100 and each core network 112. However, it is to be understood that the back-haul can be implemented in other ways.

The exemplary embodiment of the system 100 shown in FIG. 1 is described here as being implemented as a Long Term Evolution (LTE) radio access network providing wireless service using an LTE air interface. LTE is a standard developed by 3GPP standards organization. In this embodiment, the controller 104 and RPs 106 together are used to implement an LTE Evolved Node B (also referred to here as an "eNodeB" or "eNB") that is used to provide user equipment 110 with mobile access to the wireless network operator's core network 112 to enable the user equipment 110 to wirelessly communicate data and voice (using, for example, Voice over LTE (VoLTE) technology).

Also, in this exemplary LTE embodiment, each core network 112 is implemented as an Evolved Packet Core (EPC) 112 comprising standard LTE EPC network elements such as, for example, a mobility management entity (MME) 114 and a Serving Gateway (SGW) 116 and, optionally, a Home eNodeB gateway (HeNB GW) (not shown in FIG. 1) and a Security Gateway (SeGW) (not shown in FIG. 1).

Moreover, in this exemplary embodiment, each controller 104 communicates with the MME 114 and SGW 116 in the EPC core network 112 using the LTE S1 interface and communicates with other eNodeBs using the LTE X2 interface. For example, the controller 104 can communicate with an outdoor macro eNodeB (not shown) via the LTE X2 interface.

Each controller 104 and the radio points 106 can be implemented so as to use an air interface that supports one or more of frequency-division duplexing (FDD) and/or time-division duplexing (TDD). Also, the controller 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the controller 104 and the radio points 106 can implement one or more of the LTE transmission modes. Moreover, the controller 104 and/or the radio points 106 can be configured to support multiple air interfaces and/or to support multiple wireless operators.

In the exemplary embodiment shown in FIG. 1, the front-haul that communicatively couples each controller 104 to the one or more RPs 106 is implemented using a standard ETHERNET network 118. However, it is to be understood that the front-haul between the controllers 104 and RPs 106 can be implemented in other ways.

Generally, one or more nodes in a C-RAN perform analog radio frequency (RF) functions for the air interface as well as digital Layer 1, Layer 2, and Layer 3 (of the Open Systems Interconnection (OSI) model) functions for the air interface.

In the exemplary embodiment shown in FIG. 1, each baseband controller 104 comprises a baseband modem that perform digital Layer-3, Layer-2, and Layer-1 processing for the LTE air interface, and each RP 106 includes (optionally) one or more Layer-1 units (not shown) that implements any Layer-1 processing for the air interface that is not performed in the controller 104 and one or more radio frequency (RF)

circuits (not shown) that implement the RF front-end functions for the air interface and the one or more antennas 108 associated with that RP 106.

Each baseband controller 104 can be configured to perform all of the digital Layer-3, Layer-2, and Layer-1 processing for the air interface, while the RPs 106 (specifically, the RF circuits) implement only the RF functions for the air interface and the antennas 108 associated with each RP 106. In that case, IQ data representing time-domain symbols for the air interface is communicated between the controller 104 and the RPs 106. Communicating such time-domain IQ data typically requires a relatively high data rate front haul. This approach (communicating time-domain IQ data over the front haul) is suitable for those implementations where the front-haul ETHERNET network 118 is able to deliver the required high data rate.

If the front-haul ETHERNET network 118 is not able to deliver the data rate needed to front haul time-domain IQ data (for example, where the front-haul is implemented using typical enterprise-grade ETHERNET networks), this issue can be addressed by communicating IQ data representing frequency-domain symbols for the air interface between the controllers 104 and the RPs 106. This frequency-domain IQ data represents the symbols in the frequency domain before the inverse fast Fourier transform (IFFT) is performed. The time-domain IQ data can be generated by quantizing the IQ data representing the frequency-domain symbols without guard band zeroes or any cyclic prefix and communicating the resulting compressed, quantized frequency-domain IQ data over the front-haul ETHERNET network 118. Additional details regarding this approach to communicating frequency-domain IQ data can be found in U.S. patent application Ser. No. 13/762,283, filed on Feb. 7, 2013, and titled "RADIO ACCESS NETWORKS," which is hereby incorporated herein by reference.

Where frequency-domain IQ data is front-hauled between the controllers 104 and the RPs 106, each baseband controller 104 can be configured to perform all of the digital Layer-3, Layer-2, and Layer-1 processing for the air interface except for the inverse fast Fourier transform (IFFT) in the downlink and the fast Fourier transform (FFT) in the uplink. In this case, the Layer-1 functions in each RP 106 can be configured to implement the digital Layer-1 processing for the air interface that is not performed in the controller 104 (that is, the IFFT in the downlink and the FFT in the uplink).

Where the front-haul ETHERNET network 118 is not able to deliver the data rate need to front haul (uncompressed) time-domain IQ data, the time-domain IQ data can be compressed prior to being communicated over the ETHERNET network 118, thereby reducing the data rate needed communicate such IQ data over the ETHERNET network 118.

Data can be front-hauled between the controllers 104 and RPs 106 in other ways (for example, using front-haul interfaces and techniques specified in the Common Public Radio Interface (CPRI) and/or Open Base Station Architecture Initiative (OBSAI) family of specifications).

Each baseband controller 104 can be implemented in software or firmware executing on one or more suitable programmable processors. Each baseband controller 104 (or portions thereof) can be implemented in other ways (for example, in a field programmable gate array (FPGA), application specific integrated circuit (ASIC), etc.). Each baseband controller 104 can be implemented in other ways.

Likewise, one or more Layer-1 units (not shown) in each RP 106 can be implemented in software or firmware executing on one or more suitable programmable processors. The one or more Layer-1 units in each RP 106 (or portions thereof) can be implemented in other ways (for example, in a field programmable gate array (FPGA), application specific integrated circuit (ASIC), etc.). The one or more RF circuits in each RP 106 can be implemented using one or more RF integrated circuits (RFICs) and/or discrete components. The Layer-1 units and RF circuit in each RP 106 can be implemented in other ways.

In the exemplary embodiment shown in FIG. 1, a management system 120 is communicatively coupled to the controllers 104 and RPs 106, for example, via the Internet 114 and ETHERNET network 118 (in the case of the RPs 106).

In the exemplary embodiment shown in FIG. 1, the management system 120 communicates with the various elements of the system 100 using the Internet 114 and the ETHERNET network 118. Also, in some implementations, the management system 120 sends and receives management communications to and from the controllers 104, each of which in turn forwards relevant management communications to and from the RPs 106.

With traditional base stations (for example, with traditional small cell or traditional distributed base stations), each baseband unit is used to create a separate cell, having a separate physical cell identifier associated with that cell and transmitting separate control and reference signals associated with that cell. In the event that the capacity of a single baseband unit is not sufficient to service a given coverage area with a single cell, an additional baseband unit is typically deployed and the coverage area is divided into to two separate cells, with each cell being serviced by a different baseband unit.

However, when the capacity provided by several baseband units (for example, in the form of several small cell base stations) is densely deployed within a site (with the capacity provided by each baseband unit used to create a separate cell), multiple overlapping cells are created with interference at cell borders. This happens even when there is a traditional central service controller that is coordinating multiple small cell base stations. The service controller can assist with network configuration and optimization, handovers, and backhaul aggregation, but does not address the issue that each small cell base station forms a separate, standalone cell and interferes with its neighboring separate, standalone cells. The signal quality in these overlap areas can drop significantly, reducing data speeds and impairing voice quality. Also, creating multiple separate cells generates frequent handovers, for example, in the form of "ping-ponging" of stationery users in border areas, or as users move about the site. This further degrades the user experience and creates the potential for handover failures.

To avoid these issues that arise with traditional small cell implementations where each small cell creates a separate cell, a single controller (baseband unit) can be used with multiple RPs to form a single cell, which avoids interference, hand-over, and performance issues with traditional small cell deployments. One example of such a system is described in U.S. Pat. No. 9,414,399. However, there is a limit to the number of UEs that can be served by a single baseband unit. To address this capacity issue, in the exemplary embodiment shown in FIG. 1, a plurality of baseband controllers 104 are deployed in a cluster 122 to service a common, single "super" cell 124, sharing a common physical cell identifier and for which common control and reference signals are transmitted. The number of baseband controllers 104 that are assigned to servicing the cell 124 can be configured statically and/or dynamically (for example, based on a temporal or usage-based policy). The assignment of baseband controllers 104 to the cell 124 can be carried out by the management system 120.

In this exemplary embodiment, when multiple baseband controllers 104 are used to service the cell 124, one of the baseband controllers 104 is designated as the "cell manager baseband controller" 104 (also referred to here as the "cell manager" 104). In this exemplary embodiment, the cell manager 104 handles certain cell-related and user-related processing for the cell 124 (for example, implementing a control-plane connection (S1-MME connection) with the MME 114 and radio resource management (RRM) functions), whereas other user-related processing is distributed across the various controllers 104 assigned to that cell 124.

In this example, one of the controllers 104 servicing that cell 124 is assigned to each UE 110 that is connected to the cell 124, where that assigned controller 104 creates and maintains the UE context 301 (shown in FIG. 3) for that UE 110 and handles certain user-related processing for that UE 110 (for example, implementing a user-plane connection (S1-U connection) with the SGW 116 and radio resource control (RRC) and application functions). The controller 104 that is assigned to a particular UE 110 is referred to here as the "home controller" 104 for that UE 100. Also, a UE 110 is referred to here as being "homed" to the controller 104 that has been assigned to serve as the home controller 104 for that UE 110.

In this example, for the purposes of the homing and scheduling/resource allocation techniques described below, the cell 124 shown in FIG. 1 is subdivided into multiple zones 126, where each RP 106 is considered to be located in one of the zones 126. It is worth noting that the C-RAN 100 is configured so that each controller 104 is able to communicate with all of the RPs 106 as necessary, irrespective of the zone of the RPs 106.

Figure 2:
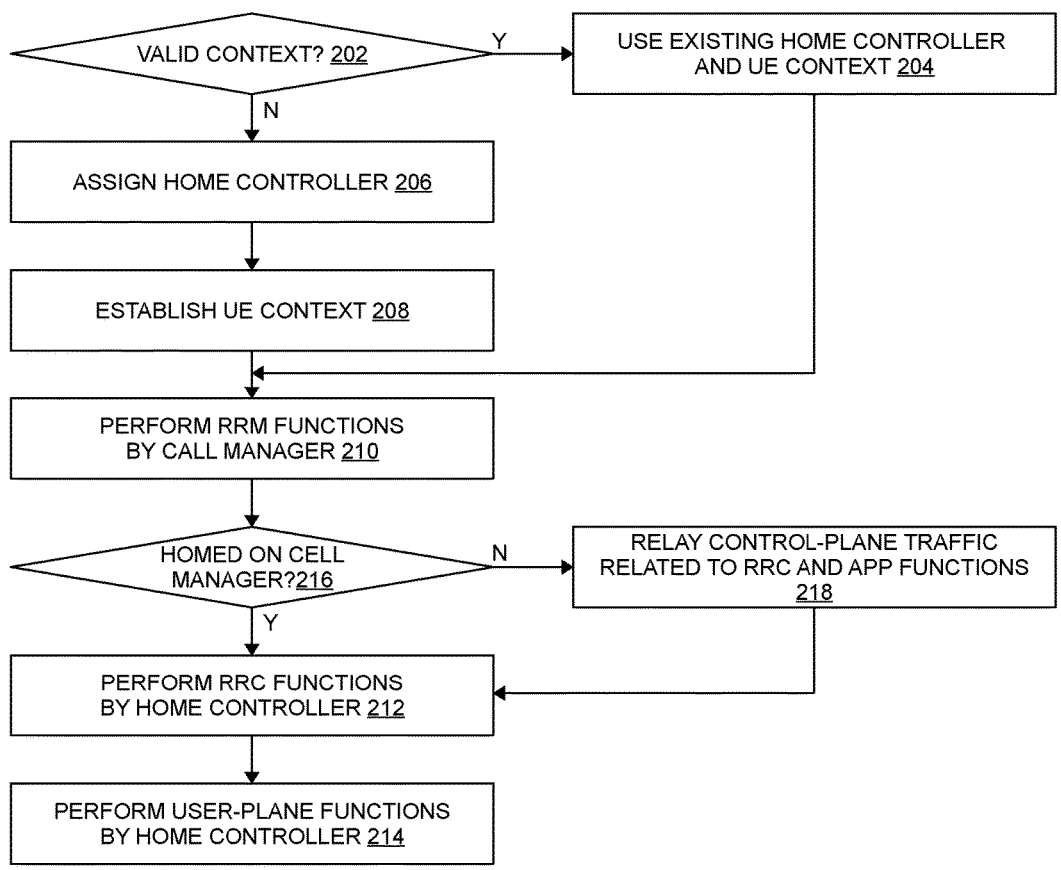

FIG. 2 comprises a flow chart illustrating one exemplary embodiment of a method 200 of performing UE homing in a C-RAN having multiple baseband units that serve a single cell. The embodiment of method 200 shown in FIG. 2 is described here as being performed using the C-RAN system 100 of FIG. 1, though it is to be understood that other embodiments can be implemented in other ways.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner).

Method 200 is described here as being performed for a UE 110 in response to that UE 110 attempting to connect or reconnect to the cell 124. In the following description of method 200, the particular UE 110 that the method 200 is being perform for is referred to here as the "current" UE 110.

When the current UE 110 attempts to connect or reconnect to the cell 124, the cell manager 104 determines if the system 100 has a valid UE context 301 (shown in FIG. 3) for the current UE 110 (block 202). The various controllers 104, as a part of the homing functions performed by them for the UEs 110 that are homed to those controllers 104, establish and maintain a UE context 301 for each UE 110. In this example, the cell manager 104 maintains information about the UEs 110 that have a valid UE context 301 established for them in the system 100.

If the system 100 has a valid UE context 301 for the current UE 110, then the home controller 104 that established and maintained that UE context 301 is considered the home controller 104 for the current UE 110 (block 204).

If the system 100 does not have a valid UE context 301 for the current UE 110, a home controller 104 is assigned to the current UE 110 (block 206). In this embodiment, the home controller 104 assigned to a UE 110 does not change while the UE 110 is using the cell 124, even if the UE moves to another zone 126. In this example, this assignment is performed by the cell manager 104.

This homing operation (that is, assigning a home controller 104 to a UE 110) is performed whenever a UE 110 does not already have a valid context 301 in the C-RAN system 100 and the UE 110 is attempting to connect to the cell 124. In this example, the homing operation is performed when a UE 110 initially accesses the cell 124 and when a UE 110 is handed-in to the cell 124.

In this example, the homing operation is performed differently depending on whether the UE 110 is making an initial connection to the cell 124 or is handed-in to the cell 124.

In this example, if the UE 110 is being handed-in to the cell 124, a home controller 104 is assigned to the UE 110 using a load-balancing algorithm.

In this example, if the UE 110 is making an initial connection to the cell 124, a home controller 104 is assigned to the UE 110 based on where the UE 110 is located within the cell 124. The home controller 104 assigned to each UE 110 is determined based on which zone 126 the UE 110 is in when that UE 110 first accesses the network 100. Each baseband controller 104 is assigned to serve as the home controller 104 for one of the zones 126. If a UE 110 is within a given zone 126, then that UE 110 is homed to that controller 104. In this embodiment, the baseband controller 104 serving as the cell manager for the cell 124 is also assigned to one of the zones 126 and serves as the home controller 104 for those UEs 110 that are in that zone 126 when those UEs 110 first accesses the cell 124.

In this embodiment, the location of each UE 110 is determined using a signature vector. The cell manager 104 determines a signature vector for each active UE 110 based on receive power measurements made at each radio point 106 for that UE 110. In general, when a UE 110 makes initial LTE Physical Random Access Channel (PRACH) transmissions to access the cell 124, each RP 106 will receive those initial PRACH transmissions. The cell manager 104 maintains a signature vector for each UE 110 that includes, for each RP 106 associated with the cell 124, a signal reception metric indicative of the power level received by that RP 106 from that UE 110 (for example, a signal-to-noise plus interference ratio (SNIR)). This signature vector (SV) is a measure of the UE's proximity to each RP 106 and is used to track the mobility of the UE 110. Initially, this SV will be based solely on the reception of the initial PRACH transmissions when the UE 110 first connects to the cell 124. As additional uplink transmissions from that UE 110 are received by the various RPs 106 in the cell 124, the cell manager 104 will update the signature vector for that UE 110 based on the relative received power of the UE's uplink channel at the RPs 106. In one implementation, each RP's entry in the signature vector for a given UE 110 is quantized to one of two values $\{0,1\}$, and the resulting signature vector is also referred to here as the "quantized signature vector" or "QSV" for that UE 110. In this embodiment, the QSV for each UE 110 is used to determine the location of each UE 110 (for example, using bit masks to efficiently compare QSVs and to determine if a UE 110 is within a given zone 126). The cell manager 104 communicates with all of the RPs 106 in the cell 124 to carry out this signature vector-related processing. Additional details regarding determining the QSV for each UE 110 can be found in US Patent Publication No. 2016-0037550.

A UE 110 is considered to be in the zone 126 assigned to the RP 106 for which that UE 110 has the highest (best) signal reception metric. This RP 106 is also referred to here as the "primary RP 106" for that UE 110. The primary RP 106 for a UE 110 changes as the UE 110 moves throughout the cell 124.

The cell manager 104 comprises a homing function 300 (shown in FIG. 3) that is configured to carry out this homing process in order to assign each UE 110 in the cell 124 to the proper zone 126 when that UE 110 initially accesses the cell 124.

As noted above, in this embodiment, the home controller 104 assigned to a UE 110 does not change while the UE 110 is using the cell 124, even if the UE moves to another zone 126.

Referring again to FIG. 2, after the home controller 104 is assigned to the current UE 110, the home controller 104 establishes a UE context 301 for the current UE 110 (block 208).

Once the current UE 110 has a valid UE context 301 (either recently established or one that was previously established), radio resource management (RRM) functions for the current UE 110 are performed by the cell manager 104 (block 210), radio resource control (RRC) and application functions for the current UE 110 are performed by the home controller 104 assigned to the current UE 110 (block 212), and user-plane functions for the current UE 110 are performed by the home controller 104 assigned to the current UE 110 (block 214).

Figure 3:
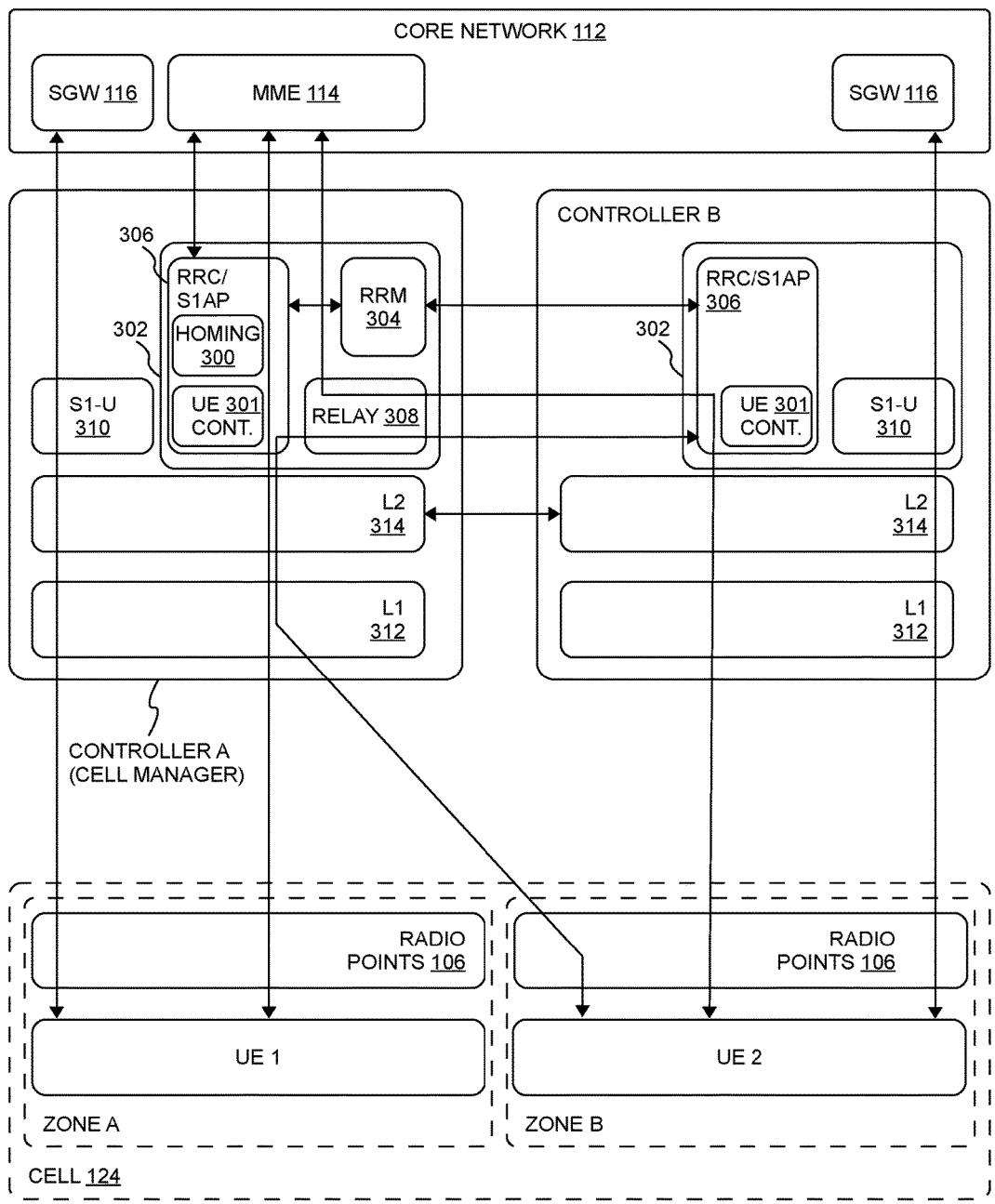
FIG. 3 is a diagram illustrating one example of the operation of method of FIG. 2 in the C-RAN system of FIG. 1.

Each baseband controller 104 for the cell 124 implements control-plane functionality 302 (shown FIG. 3) and user-plane processing functionality 310 (shown in FIG. 3).

In this embodiment, the control-plane functionality 302 in the cell manager 104 comprises a radio resource management (RRM) function 304 (shown in FIG. 3) that handles all RRM functions for all of the UEs 110 in the cell 124 (regardless of which controller 104 is designated as the home controller for those UEs 110).

In this example, the control-plane functionality 302 in the cell manager 104 is configured to establish and host a control-plane connection (a S1-MME connection in this example) with the MME 114. Thus, the MME 114 in the core network 112 need only establish a control-plane connection with a single controller 104 for the cell 124.

In this example, the control-plane functionality 302 in all of the controllers 104 for the cell 124 comprises a radio resource control and application function 306 (shown in FIG. 3) that handles all RRC and application functions for the UEs 110 assigned to that controller 104. In this LTE example, the radio resource control and application function 306 handle all LTE RRC and S1 Application Part (S1AP) functions for the UEs 110 assigned to that controller 104.

Referring again to FIG. 2, if the current UE 110 is not homed to the controller 104 that is the cell manager 104 for the cell 124 (checked in block 216), control-plane traffic associated with the RRC and application processing for the current UE 110 that is communicated to and from the MME 114 over the S1-MME connection hosted by the cell manager 104 is relayed between the cell manager 104 for the cell 124 and the home controller for the UE 110 (block 218).

As noted above, all control-plane traffic is communicated to the MME 114 over the S1-MME connection that is hosted by the cell manager 104. Therefore, the cell manager 104 implements a relay function 308 (shown in FIG. 3) that enables the cell manager 104 to relay control-plane traffic associated with the RRC and application processing for UEs 110 that are homed to a different controller 104. The relay function 308 relays such RRC and application control-plane traffic between the cell manager 104 and the relevant home controller 104. In one implementation, all of the controllers 104 are co-located together in the same server room and interconnected with each other over a local area network (though it is to be understood that other embodiments can be implemented in other ways).

In this example, the user-plane processing functionality 310 in each baseband controller 104 is configured to handle the user-plane processing for the UEs 110 that are homed to that controller 104. In this LTE example, the user-plane processing functionality 310 comprises LTE S1 Interface User (S1-U) processing.

In this example, the user-plane functionality 310 in each home controller 104 is configured to establish and host a respective control-plane connection (a S1-U connection in this example) with the SGW 116 and is configured to communicate directly with the associated SGW 116. As a result, user-plane traffic does not need to be relayed through the cell manager 104.

Each controller 104 also comprises layer one (L1) functionality 312 (shown in FIG. 3) and layer 2 (L2) functionality 314 (shown in FIG. 3) that implement the relevant L1 and L2 functions for the protocols used in the network 100.

FIG. 3 is a diagram illustrating one example of the operation of method 200 in the C-RAN system 100 of FIG. 1.

In the example shown in FIG. 3, two baseband controllers 104 are shown—one of which is referred to here as "controller A" and the other of which is referred to here as "controller B." In this example, controller A is designated as the cell manager 104 for the cell 124. In this example, the zone 126 assigned to controller A is also referred to here as "zone A," and the zone 126 assigned to controller B is also referred to here as "zone B."

In the example shown in FIG. 3, two UEs 1 and 2 are accessing the cell 124.

FIG. 3 shows the two UEs 1 and 2 at the time when they initially access the cell 124. The homing function 300 in the cell manager (controller A) performs the homing operation in order to assign a home controller to UE 1 and UE 2. In this example, UE 1 is in zone A when it initially accessed the cell 124, and UE 2 is in zone B when it initially accessed the cell 124. As a result, controller A is assigned as the home controller for UE 1, and controller B is assigned as the home controller for UE 2.

As noted above, the home controller assigned to UEs 1 and 2 does not change while the UEs 1 and 2 are using the cell 124, even if they move to a different zone 126.

All control-plane traffic for both UEs 1 and 2 is communicated to and from the MME 114 via the S1-MME connection established by the cell manager (controller A). The control-plane functionality 302 in controller A handles the control-plane related processing for UE 1 since controller A is the home controller for UE 1. However, only the RRM-related processing for UE B is performed by the RRM function 304 of the cell manager (controller A), whereas all RRC and application processing for UE 2 is performed by the RRC/S1AP function 306 of controller B. As a consequence, control-plane traffic related to the RRC and application processing for UE 2 that is communicated to and from the MME 114 over the S1-MME connection must be relayed between the control-plane functionality 302 of the cell manager (controller A) and the control-plane functionality 302 of controller B. The relay function 308 in the cell manager handles this relaying.

A S1-U connection is established and hosted by the user-plane processing functionality 310 of controller A (the home controller for UE 1), and a S1-U connection is established and hosted by the user-plane processing functionality 310 of controller B (the home controller for UE 2). Each such user-plane connection is established directly with the SGW 116 (that is, without relaying via the cell manager 104).

Generally, when a UE 110 accesses the cell 124, a random access (RACH) procedure is typically involved at some point.

In this LTE example, an important message that is sent as a part of the RACH procedure is the MSG3 message, which is sent from the UE 110 to the relevant eNodeB. In the case of the C-RAN 100 shown in FIG. 1, the eNodeB functionality is implemented using the controllers 104 and the RPs 106 for the cell 124.

All RACH-related messages for the UEs 110 within the cell 124 flow through the cell manager 104. In general, a MSG3 is sent in four important cases, which are as follows: (1) a RACH procedure for an initial connection request; (2) a RACH procedure for a connection re-establishment request; (3) a RACH procedure for handover (HO) completion (that is, a RRC reconfiguration complete message); and (4) a RACH procedure for when uplink synchronization is lost.

In cases 1 and 3, the UE 110 is making a new connection to the cell 124 and does not have a valid context 301, in which case the cell manager 104 has to assign that UE 110 a home controller 104 and is able to make that assignment based on the homing algorithm implemented by the homing function 300. In these two cases, the cell manager 104, as a part of the RACH procedure, will receive the MSG3 and forward the MSG3 function (using the relay function 308) to the RRC function 306 of the home controller 104 assigned to the UE 110 that sent the MSG3 (if the cell manager 104 is not the home controller 104).

In cases 2 and 4, the UE 110 already has a valid context 301 within the C-RAN system 100 and is re-establishing its association with that previously-created context 301. In these two cases, the cell manager 104, in response to receiving the MSG3, determines which controller 104 was previously assigned to the UE 110 to be its home controller 104 and forwards the MSG3 function (using the relay function 308) to the RRC function 306 in that home controller 104 (if the cell manager 104 is not the home controller 104) for processing of the MSG3.

Figure 4:
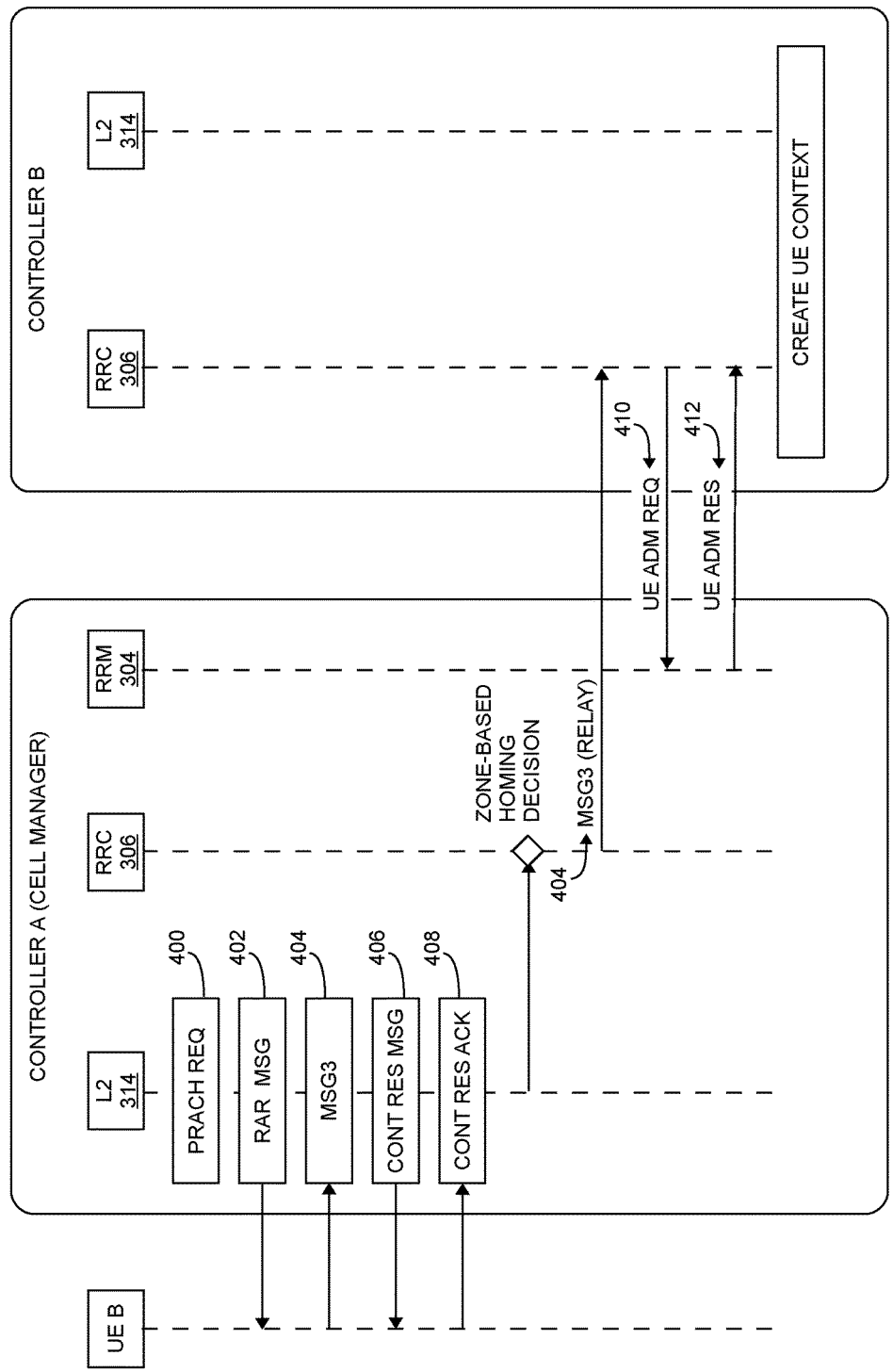
FIG. 4 illustrates one example of the case where the random access (RACH) procedure is used for an initial connection request.

FIG. 4 illustrates one example of case 1 (that is, where the RACH procedure is used for an initial connection request). The example shown in FIG. 4 is performed for UE 2 shown in FIG. 3.

In this example, UE 2 initiates the RACH procedure on the uplink PRACH by sending a PRACH preamble transmission 400. All of the RPs 106 in the C-RAN system 100 will receive the PRACH preamble transmission 400 and forward the associated baseband data to the cell manager 104. As noted above, for each RP 106 associated with the cell 124, a signal reception metric indicative of the power level at which the PRACH transmission was received by that RP 106 is determined. This metric is used to create the QSV as noted above.

In response to PRACH preamble transmission 400, the cell manager 104 transmits a Random Access Response (RAR) Message 402 via all of the RPs 106. The RAR Message 402 is transmitted on the Physical Downlink Shared Channel (PDSCH) and contains the random identity sent by the device, a Cell Radio Network Temporary ID (T_C-RNTI) which will be used for all further bandwidth assignments, and an initial uplink bandwidth assignment. UE B then transmits MSG3 404, which is received at all of the RPs 106, which forward the associated baseband data to the cell manager 104. If necessary, contention resolution messages 406 and 408 are exchanged.

Ultimately, the MSG3 404 triggers a homing decision by the homing function 300 (associated with the RRC/S1AP function 306) in the cell manager 104. In this example, the MSG3 is sent for an initial connection request (case 1 noted above) and the homing function 300 assigns a home controller 104 to UE 2 based on which zone 126 the UE 2 is located in. In this example, the QSV maintained for UE 2 is used to make this determination. UE 2 is considered to be in the zone 126 corresponding to the primary RP 106 for UE 2 (that is, the RP 106 having the highest (best) signal reception metric in the QSV). In this example, where UE 2 is in zone B, the homing function 300 in the cell manager 104 assigns controller B to be the home controller 104 for UE 2 and forwards the MSG3 404 to the RRC/S1AP function 306 in controller B. This is done in this example to, on a best-effort basis, try and home UEs 110 that are near each other (and which tend to compete for the same radio resources) to the same controller 104 so that radio resource allocation for these competing UEs 110 can be done with minimal inter-controller coordination and communication. The RRC/S1AP function 306 in controller B exchanges radio admission control request messages 410 and 412 with the RRM function 304 of the cell manager 104 in order to request a radio bearer channel for UE 2. After this is done, the RRC/S1AP function 306 in controller B also instantiates the context 301 for that UE 2.

Figure 5:
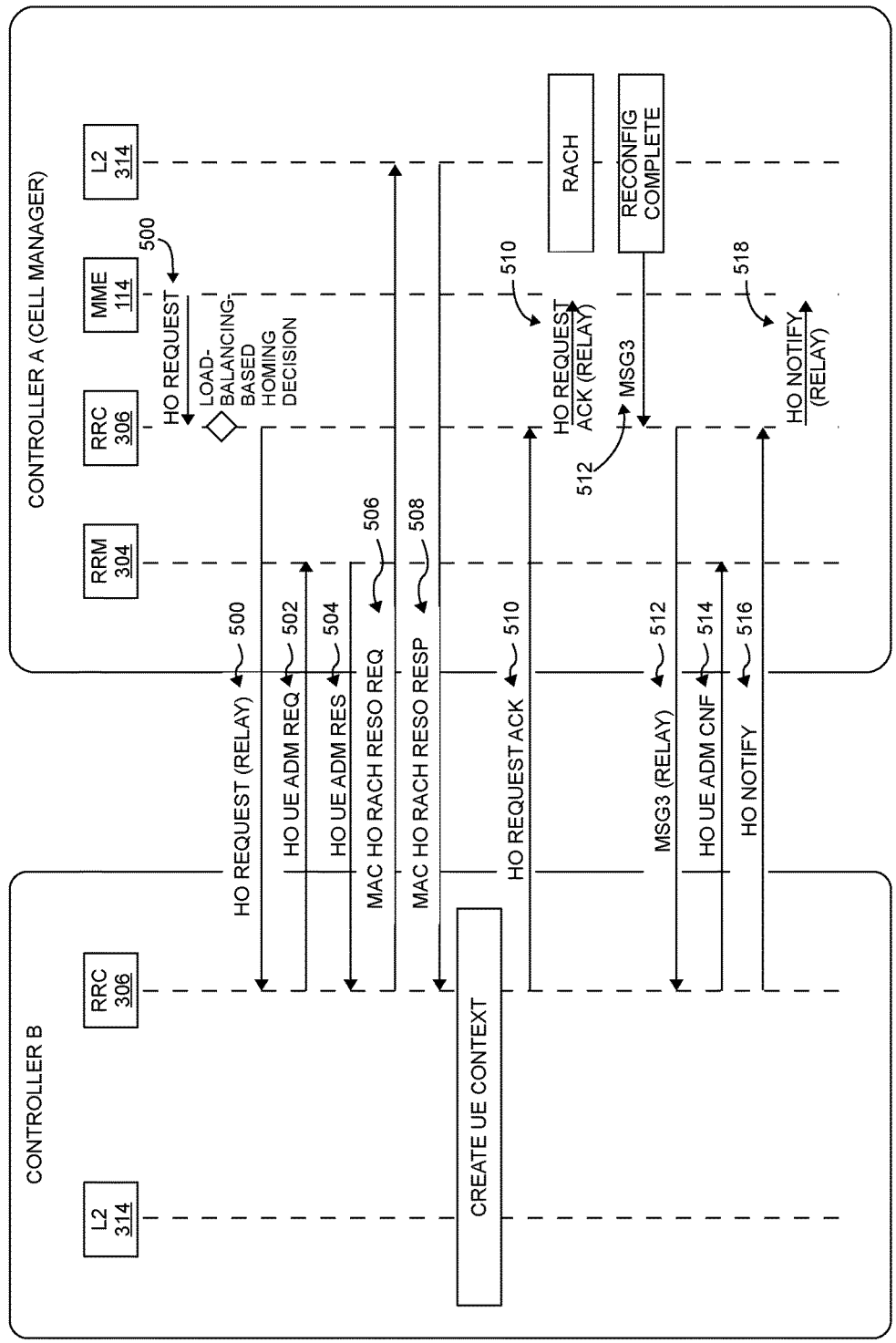
FIG. 5 illustrates one example of the case where the RACH procedure is used for handover (HO) completion.

FIG. 5 illustrates one example of case 3 (that is, where the RACH procedure is used for handover (HO) completion). The example shown in FIG. 5 is performed for UE 2 shown in FIG. 3 in connection with the UE 2 accessing the cell 124 via a handover (hand-in) from another eNodeB to the cell 124.

In this example, the cell manager 104 will receive a handover (HO) request message 500 from the MME 114 over the S1-MME connection hosted by the cell manager 104. The reception of the HO request message 500 triggers a homing decision by the homing function 300 (associated with the RRC/S1AP function 306) in the cell manager 104. In this example, the RACH procedure has not yet been performed and the cell manager 104 will not have created a QSV for the UE 2 in order to determine which zone 126 the UE 2 is in. In this case, the homing function 300 can use a load balancing algorithm to assign a home controller 104 to the UE 2. In alternative embodiments, the homing function 300 assigns a home controller 104 to the UE 2 in other ways.

In this example, the homing function 300 assigns controller B to be the home controller for UE 2 and forwards the HO request message 500 to the RRC/S1AP function 306 in controller B.

The RRC/S1AP function 306 in controller B exchanges radio admission control request messages 502 and 504 with the RRM function 304 of the cell manager 104 in order to request a radio bearer channel for UE B. The RRC/S1AP function 306 in controller B also interacts with the L2 function 314 in controller B together allocate a RACH preamble and a C-RNTI for UE B (via messages 506 and 508). After this is done, the RRC/S1AP function 306 in controller B also instantiates the context 301 for that UE 2 and responds back to the MME 114 with a handover request acknowledgement message 510, which is first sent to the RRC/S1AP function 306 in the cell manager 104 and is relayed by the relay function 308 to the MME 114 over the S1-MME connection hosted by the cell manager 104.

The MME 114 completes the handover and causes the UE 2 to reconfigure itself for the handover. UE 2 will use the RACH procedure to access the cell 124 (the target eNodeB of the handover). In connection with this, UE 2 will send a MSG3 512 (a RRC reconfiguration complete message). As noted above, all RACH-related messages for the UEs within the cell 124 flow through the cell manager 104. Therefore, the cell manager 104 will receive the MSG3 512 sent from UE 2 relaying it to the RRC/S1AP function 306 in controller B, which then executes the handover (messages 514, 516, and 518). In executing the handover, any messages sent to the MME 114 by the RRC/S1AP function 306 in controller B are relayed via the relay function 308.

In this embodiment, the baseband controllers 104 and RPs 106 are configured to support radio resource reuse. Radio resource reuse refers to situations where two or more UEs 110 communicate user-plane transmissions using the same radio resource elements in the same cell 124. Reuse can be used where a first UE 110 is provided wireless service by of first group of RPs 106 and a second UE 110 is provided wireless service by a second group of RPs 106. Each of these groups is also referred to here as the "simulcast group" for the associated UE 110. Reuse is possible when the respective simulcast groups are "orthogonal." Two simulcast groups are orthogonal if no RP 106 is included in both simulcast groups. That is, simulcast groups are orthogonal if they are disjoint or mutually exclusive. If the two simulcast groups are orthogonal, then the same radio resource can be used at the same time by the two UEs 110 having those two simulcast groups. Additional details regarding this can be found in US Patent Publication No. 2016-0037550.

Conventional approaches to enabling radio resource reuse typically involve the use of multiple cells. These conventional approaches however typically result in increased interference at the boundaries of the cells and require the use of handovers between the cells as a UE move between cells.

In the exemplary embodiment shown in FIG. 1, radio resource scheduling for the single cell 124 is also distributed among the various baseband controllers 104. Conventional distributed scheduling techniques, however, typically require extensive coordination between the distributed scheduling entities. This extensive coordination typically does not scale well. However, the scheduling technique described here enables flexible radio resource reuse without the use of multiple cells or handovers among baseband controllers 104 while enabling such scheduling to scale well.

FIG. 6 comprises a flow chart illustrating one exemplary embodiment of a method 600 of performing distributed scheduling in a C-RAN having multiple baseband units that serve a single cell. The embodiment of method 600 shown in FIG. 6 is described here as being performed in the C-RAN system 100 of FIG. 1, though it is to be understood that other embodiments can be implemented in other ways.

The blocks of the flow diagram shown in FIG. 6 have been arranged in a generally sequential manner for ease of explanation; however, it is to be understood that this arrangement is merely exemplary, and it should be recognized that the processing associated with method 600 (and the blocks shown in FIG. 6) can occur in a different order (for example, where at least some of the processing associated with the blocks is performed in parallel and/or in an event-driven manner).

Method 600 is described here as being performed for each transmission time interval (TTI), and, in the following description of method 600, the particular TTI that the method 600 is being performed for is referred to as the "current" TTI.

Method 600 comprises selecting UEs 110 to schedule (block 602) and exchanging UE information among controllers 104 (block 604). In this example, each controller 104 selects a predetermined number (for example, 8) of UEs 110 for scheduling for the current TTI. The UEs 110 can be selected from the prioritized UE lists each controller 104 maintains. Each controller 104 sends the UE information (such as resource demand information, priority metrics, QSV, etc.) for the selected UEs 110 to all of the other controllers 104.

Method 600 further comprises classifying the selected UEs 110 into zones 126 of the cell 124 (block 606) and classifying the selected UEs 110 into "inner" and "border" UEs 110 (block 608).

In this example, the selected UEs 110 are classified into zones 126 based on the current location of each UE 110. This can be done using the QSV for each UE 110. Each UE 110 is considered to be located in the zone 126 that the primary RP 106 for that UE 110 is located in. The zone 126 that the UE 110 is located in is referred to here as the "current" zone 126 for that UE 110.

The QSVs for the selected UEs 110 can be used in determining in which zone 126 each UE 110 is located. The QSV for each selected UE 110 can be quantized to create a "primary" bitmask for that UE 110 that includes a "1" in the bit position that corresponds to the primary RP 106 for that UE 110 and a "0" in all other bit positions. Then, a "zoning" bitmask can be applied to the primary bitmask in a logical "AND" operation. Each zone 126 has a respective "zoning" bitmask that has a "1" in the bit positions corresponding to those RPs 106 that are in that zone 126 and has a "0" in the bit positions corresponding to those RPs 106 that are not in that zone 126. The result of the logical "AND" operation between the zoning bitmask for a given zone 126 and the primary bitmask for a given UE 110 will result in a value of 0 if that UE 110 is not located within that zone 126 and will have a non-zero value if the UE 110 is located within that zone 126.

In this example, the controller 104 that performs the scheduling for each selected UE 110 is the controller 104 associated with the UE's current zone 126 and is also referred to here as the "scheduling controller" 104 for that UE 110.

As used herein, an "inner" UE 110 is a UE 110 that has a simulcast group of RPs 106 where all of the RPs 106 are located in the current zone 126 for that UE 110. As used herein, a "border" UE 110 is a UE 110 that has a simulcast group of RPs 106 that includes at least one RP 106 that is located outside of the current zone 126 for that UE 110.

The QSVs for the selected UEs 110 can be used in determining if each UE 110 is an inner UE 110 or a border UE 110. The QSV for each UE 110 can be quantized to create a "simulcast" bitmask for that UE 110 that includes a "1" in the bit position that corresponds to each RP 106 in the simulcast group for that UE 110 and a "0" in all other bit positions.

The result of the logical "AND" operation between the zoning bitmask for a given zone 126 and the simulcast bitmask for a given UE 110 will result in a value of 0 if none of the RPs 106 in the simulcast group are located within that zone 126 and will have a non-zero if at least one RP 106 in the simulcast group is located within that zone 126. This can be done for each zone 126 in order to determine which zones 126 include an RP 106 in the simulcast group for each UE 110. If all of the RPs 106 in a UE's simulcast group are located in the current zone 126 for that UE 110, then that UE 110 is an inner UE 110. If at least one of the RPs 106 in a UE's simulcast group is located in a zone 126 other than the current zone 126, then that UE 110 is a border UE 110. As used herein, a "border" RP 106 refers to a RP 106 that is in a UE's simulcast group but is located in a zone 126 other than the current zone 126 for that UE 110.

Method 600 further comprises determining resource splits for all border radio points 106 (block 610). More specifically, for each RP 106 in a given zone 126, the associated controller 104 determines which of the selected UEs 110 include that RP 106 in their simulcast group and which, if any, of those selected UEs 110 are located outside of that zone 126. Then, for each such RP 106, the scheduling controllers 104 associated with those UEs 110 split the radio resources for that RP 106. This split can be performed in various ways. In one example, this split is done based on a quality-of-service (QOS) priority metric associated with each affected UE 110.

Method 600 further comprises allocating radio resources to each selected UE 110 by the respective scheduling controller 104 (block 612). The scheduling controller 104 for each selected UE 110 may be different from the home controller 104 for that UE 110 (for example, where the UE 110 has moved after first connecting to the cell 124). Also, each scheduling controller 104, in allocating resources, must respect and account for the resource splits for any border RPs 106 that are within the associated zone 126. Each scheduler controller 104 can otherwise independently allocate the radio resources to the selected UEs 110 that are within the associated zone 126.

In this way, each scheduling controller 104 need only coordinate with those controllers 104 associated with the relevant border RPs 106, which typically will only involve the immediate neighbor zones 126 for the scheduling controller 104. Thus, for a given scheduling controller 104 and zone 126, adding to the cell 124 additional distant zones 126 and controllers 104 will not increase the amount of coordination that will occur for that controller 104. As a result, this approach to scheduling scales effectively as zones 126 and controllers 104 are added to a cell 124.

Also, as noted above, each controller 104 schedules those selected UEs 110 that are currently in the zone 126 assigned to that controller 104. That is, each selected UE 110 is not necessarily scheduled by its home controller 104. Instead, each scheduled UE 110 is scheduled by the controller 104 for the zone 126 that the UE 110 is currently in. Doing this avoids having to do virtual handovers as UEs 110 move from one zone 126 to another zone 126 of the cell 124.

Method 600 further comprises communicating the resource allocation made by each UE's scheduling controller 104 to the UE's home controller 104 (block 614). The home controller 104 carriers out other Layer 2 (L2) and Layer 1 (L1) functions to communicate with the UE 110 in accordance with the resource allocation.

FIG. 7 illustrates one example of the operation of method 600. This example is based on the example shown in FIG. 3, where user 2 has moved from zone B to zone A and user 1 has stayed within the zone A but is near zone B. Also, in this example, another UE (UE 3) has accessed the cell 124 and is located in zone B, with controller B serving as the home controller for UE 3.

In this example, UEs 1, 2, and 3 are selected for scheduling in the current TTI and the controllers 104 in the cluster 122 exchange information about those UEs 1, 2, and 3 (as well as the other UEs 110 that are to be scheduled in the current TTI).

Then, each of the controllers 104 classifies the selected UEs 1, 2, and 3 into zones 126 and into inner and border UEs 110. In this example, both UE 1 and UE 2 are classified as being in zone A, while UE 3 is classified as being in zone B. Therefore, controller A serves as the scheduling controller 104 for UEs 1 and 2, controller B serves as the scheduling controller 104 for UE 3.

In this example, the simulcast group for UE 1 includes RPs A-2 and B-1. That is, the simulcast group for UE 1 includes RPs in both zone A and zone B. Therefore, UE 1 is classified as a border UE (since it has at least one RP 106 in its simulcast group that is located outside of the zone 124 that it is currently in (zone A in this example)).

In this example, the simulcast group for UE 2 includes RPs A-1 and A-2. That is, the simulcast group for UE 2 includes RPs 106 that are only in zone A. Therefore, UE 2 is classified as an inner UE.

In this example, the simulcast group for UE 3 includes RPs B-1 and B-2. That is, the simulcast group for UE 3 includes RPs 106 that are only in zone B. Therefore, UE 3 is classified as an inner UE.

Also, in this example, one RP 106 (border RP B-1) is in the simulcast group of both UE 1 and UE 3. Thus, when the controllers 104 determine resource splits for all borders UEs 110, controllers A and B will split the radio resources for that border RP B-1 on pro rata basis. That is, if UEs 1 and 3 are the only UEs 110 that are using that border RP B-1, then UEs 1 and 3 can split the use of that border RP B-1 based on the particular splitting method used (for example, based on a QOS-based priority metric). Each UE 1 and 3 can use that border RP B-1 during non-overlapping radio resources in accordance with the determined split.

Then, each of the controllers A and B can allocate radio resources to the UEs in the associated zone A and B, respectively. In this example, controller A (serving as the scheduling controller 104 for UEs 1 and 2) allocates radio resources to UEs 1 and 2 (which are in zone A during the current TTI), and controller B (serving as the scheduling controller 104 for UE 3) allocates radio resources to UE 3. In allocating resources for the current TTI, controllers A and B respect the resource split that was determined for the border RP B-1.

The resource allocation made by each UE's scheduling controller 104 is communicated to the UE's home controller 104, the home controller 104 carriers out other Layer 2 (L2) and Layer 1 (L1) functions to communicate with the UE 110 in accordance with the resource allocation. That is, the resource allocations determined for UEs 1 and 2 by scheduling controller A are communicated to the home controllers 104 for these UEs 1 and 2 (which are controller A and B, respectively), and the resource allocation determined for UE 3 by scheduling controller B is communicated to the home controller 104 for UE 3 (which is controller B).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes a system to provide wireless service, the system comprising: a baseband controller cluster; and a plurality of radio points; wherein the baseband controller cluster and the plurality of radio points implement a base station to provide wireless service to a plurality of user equipment (UEs) using a common cell; wherein the baseband controller cluster is communicatively coupled to a core network of a wireless service provider, the baseband controller cluster comprising a plurality of baseband controllers; wherein the radio points are configured to transmit and receive radio frequency signals to and from the UEs, each of the radio points associated with at least one antenna and remotely located from the baseband controllers cluster, wherein the plurality of radio points is communicatively coupled to the baseband controller cluster; and wherein the common cell is divided into a plurality of zones, wherein each of the zones is associated with a respective one of the baseband controllers; wherein one of the baseband controllers is designated as a cell manager; wherein the cell manager is configured to, for each UE served by the cell, assign one of the baseband controllers to which that UE is homed, wherein the baseband controller to which each UE is homed does not change as the UE moves throughout the cell; wherein the cell manager is configured to, for each UE served by the cell, host a respective control-plane connection with a core network such that the home controller for that UE communicates control-plane messages with the core network via the cell manager; wherein each home controller is configured to, for each UE that the home controller serves as the home controller for, host a respective user-plane connection with the core network so that each home controller communicates user-plane messages with the core network over the respective user-plane connection; wherein the system is configured to select some of the UEs served by the cell to schedule during each current transmission time interval (TTI); wherein the system is configured to classify each selected UE into one of the zones as a current zone in which that selected UE is currently located; wherein the system is configured so that, for each selected UE, the baseband controller assigned to the current zone of that selected UE serves as a scheduling controller for that scheduled UE; wherein the system is configured to determine, for each selected UE, which radio points in the current simulcast group associated with that selected UE are border radio points located outside of the current zone for that selected UE; wherein the system is configured to, for each border radio point, determine a split of radio resources of the current TTI for that radio point among the scheduling controllers for the selected UEs that have that border radio point in the current simulcast groups thereof; and wherein each scheduling controller independently allocates radio resources to the selected UEs for which that scheduling controller serves as the scheduling controller while respecting any splits of radio resources that apply to that controller.

Example 2 includes the system of Example 1, wherein the cell manager is configured to, in response to a connection request from a UE, assign one of the baseband controllers to serve as the home controller for that UE based on the zone in which the UE is located.

Example 3 includes the system of Example 2, wherein which zone a UE is located in is determined based on a quantized signature vector determined for that UE.

Example 4 includes the system of any of the Examples 1-3, wherein the cell manager is configured to, in response to a handover request in connection with a UE being handed-in to the cell, assign one of the baseband controllers to which that UE is homed using a load-balancing algorithm.

Example 5 includes the system of any of the Examples 1-4, wherein the system is configured so that uplink traffic sent on a Physical Random Access Channel (PRACH) is communicated to the cell manager.

Example 6 includes the system of any of the Examples 1-5, wherein each control-plane connection is made with a mobility management entity (MME) of the core network.

Example 7 includes the system of any of the Examples 1-6, wherein each user-plane connection is made with a Service Gateway (SGW) of the core network.

Example 8 includes the system of any of the Examples 1-7, wherein the cell manager implements a radio resource management (RRM) function that performs RRM processing for all of the UEs served by that cell.

Example 9 includes the system of any of the Examples 1-8, wherein each baseband controller implements radio resource controller (RRC) function that performs RRC processing for any UEs homed to that baseband controller.

Example 10 includes the system of any of the Examples 1-9, wherein the system is configured to classify each selected UE for the current TTI into one of the zones as the current zone in which that selected UE is currently located using a quantized signature vector for the selected UE.

Example 11 includes the system of any of the Examples 1-10, wherein the system is configured to determine, for each selected UE, which radio points in the current simulcast group associated with that selected UE are border radio points located outside of the current zone for that selected UE using a quantized signature vector for that UE.

Example 12 includes the system of any of the Examples 1-11, wherein the baseband controller cluster is communicatively coupled to the radio points using a switched ETHERNET network.

Example 13 includes a method of providing wireless service using a baseband controller cluster and a plurality of radio points, wherein the baseband controller cluster and the plurality of radio points implement a base station to provide wireless service to a plurality of user equipment (UEs) using a common cell, wherein the baseband controller cluster is communicatively coupled to a core network of a wireless service provider, the baseband controller cluster comprising a plurality of baseband controllers, wherein the radio points are configured to transmit and receive radio frequency signals to and from the UEs, each of the radio points associated with at least one antenna and remotely located from the baseband controller cluster, wherein the plurality of radio points is communicatively coupled to the baseband controller cluster; and where the common cell is divided into a plurality of zones, the method comprising: associating each of the zones with a respective one of the baseband controllers; designating one of the baseband controllers as a cell manager for the cell; for each UE served by the cell, assigning one of the baseband controllers to serve as a home controller for that UE, wherein the home controller for each UE does not change as the UE moves throughout the cell; hosting by the cell manager, for each UE served by the cell, a respective control-plane connection with a core network; communicating control-plane messages for each UE between the core network and the home controller for that UE via the cell manager; hosting by each home controller a respective user-plane connection with the core network for each UE that the home controller serves as the home controller for; communicating user-plane messages for each UE between the core network and the home controller for that UE over the respective user-plane connection; for each current transmission time interval (TTI): selecting some of the UEs served by the cell to schedule during a current transmission time interval (TTI); classifying each selected UE into one of the zones as a current zone in which that selected UE is currently located; selecting the baseband controller assigned to the current zone of that selected UE to serve as a scheduling controller for that scheduled UE; determining, for each selected UE, which radio points in the current simulcast group associated with that selected UE are border radio points located outside of the current zone for that selected UE; for each border radio point, determining a split of radio resources of the current TTI for that radio point among the scheduling controllers for the selected UEs that have that border radio point in the current simulcast groups for those selected UEs; and independently allocating, by each scheduling controller, radio resources to the selected UEs for which that scheduling controller serves as the scheduling controller while respecting any splits of radio resources that apply to that scheduling controller.

Example 14 includes the method of Example 13, wherein the cell manager is configured to, in response to a connection request from a UE, assign one of the baseband controllers to serve as the home controller for that UE based on the zone in which the UE is located.

Example 15 includes the method of Example 14, wherein which zone a UE is located in is determined based on a quantized signature vector determined for that UE.

Example 16 includes the method of any of the Examples 13-15, wherein the cell manager is configured to, in response to a handover request in connection with a UE being handed-in to the cell, assign one of the baseband controllers to serve as the home controller for that UE using a load-balancing algorithm.

Example 17 includes the method of any of the Examples 13-16, wherein uplink traffic sent on a Physical Random Access Channel (PRACH) is communicated to the cell manager.

Example 18 includes the method of any of the Examples 13-17, wherein each control-plane connection is made with a mobility management entity (MME) of the core network.

Example 19 includes the method of any of the Examples 13-18, wherein each user-plane connection is made with a Service Gateway (SGW) of the core network.

Example 20 includes the method of any of the Examples 13-19, wherein the cell manager implements a radio resource management (RRM) function that performs RRM processing for all of the UEs served by that cell.

Example 21 includes the method of any of the Examples 13-20, wherein each baseband controller implements radio resource controller (RRC) function that performs RRC processing for any UEs homed to that baseband controller.

Example 22 includes the method of any of the Examples 13-21, wherein classifying each selected UE for the current TTI into one of the zones as the current zone in which that selected UE is currently located using a quantized signature vector for the selected UE.

Example 23 include the method of any of the Examples 13-22, wherein determining, for each selected UE, which radio points in the current simulcast group associated with that selected UE are border radio points located outside of the current zone for that selected UE is done using a quantized signature vector for that UE.

Example 24 includes the method of any of the Examples 13-23, wherein the baseband controller cluster is communicatively coupled to the radio points using a switched ETHERNET network.

What is claimed is:

1. A system to provide wireless service, the system comprising:
 a baseband controller cluster; and
 a plurality of radio points;
 wherein the baseband controller cluster and the plurality of radio points implement a base station to provide wireless service to a plurality of user equipment (UEs) using a common cell;
 wherein the baseband controller cluster is communicatively coupled to a core network of a wireless service provider, the baseband controller cluster comprising a plurality of baseband controllers;
 wherein the radio points are configured to transmit and receive radio frequency signals to and from the UEs, each of the radio points associated with at least one antenna and remotely located from the baseband controllers cluster, wherein the plurality of radio points is communicatively coupled to the baseband controller cluster; and
 wherein the common cell is divided into a plurality of zones, wherein each of the zones is associated with a respective one of the baseband controllers;
 wherein one of the baseband controllers is designated as a cell manager;
 wherein the cell manager is configured to, for each UE served by the cell, assign one of the baseband controllers to which that UE is homed, wherein the baseband controller to which each UE is homed does not change as the UE moves throughout the cell;
 wherein the cell manager is configured to, for each UE served by the cell, host a respective control-plane connection with a core network such that the home controller for that UE communicates control-plane messages with the core network via the cell manager;
wherein each home controller is configured to, for each UE that the home controller serves as the home controller for, host a respective user-plane connection with the core network so that each home controller communicates user-plane messages with the core network over the respective user-plane connection;
wherein the system is configured to select some of the UEs served by the cell to schedule during each current transmission time interval (TTI);
wherein the system is configured to classify each selected UE into one of the zones as a current zone in which that selected UE is currently located;
wherein the system is configured so that, for each selected UE, the baseband controller assigned to the current zone of that selected UE serves as a scheduling controller for that scheduled UE;
wherein the system is configured to determine, for each selected UE, which radio points in the current simulcast group associated with that selected UE are border radio points located outside of the current zone for that selected UE;
wherein the system is configured to, for each border radio point, determine a split of radio resources of the current TTI for that radio point among the scheduling controllers for the selected UEs that have that border radio point in the current simulcast groups thereof; and
wherein each scheduling controller independently allocates radio resources to the selected UEs for which that scheduling controller serves as the scheduling controller while respecting any splits of radio resources that apply to that controller.

2. The system of claim 1, wherein the cell manager is configured to, in response to a connection request from a UE, assign one of the baseband controllers to serve as the home controller for that UE based on the zone in which the UE is located.

3. The system of claim 2, wherein which zone a UE is located in is determined based on a quantized signature vector determined for that UE.

4. The system of claim 1, wherein the cell manager is configured to, in response to a handover request in connection with a UE being handed-in to the cell, assign one of the baseband controllers to which that UE is homed using a load-balancing algorithm.

5. The system of claim 1, wherein the system is configured so that uplink traffic sent on a Physical Random Access Channel (PRACH) is communicated to the cell manager.

6. The system of claim 1, wherein each control-plane connection is made with a mobility management entity (MME) of the core network.

7. The system of claim 1, wherein each user-plane connection is made with a Service Gateway (SGW) of the core network.

8. The system of claim 1, wherein the cell manager implements a radio resource management (RRM) function that performs RRM processing for all of the UEs served by that cell.

9. The system of claim 1, wherein each baseband controller implements radio resource controller (RRC) function that performs RRC processing for any UEs homed to that baseband controller.

10. The system of claim 1, wherein the system is configured to classify each selected UE for the current TTI into one of the zones as the current zone in which that selected UE is currently located using a quantized signature vector for the selected UE.

11. The system of claim 1, wherein the system is configured to determine, for each selected UE, which radio points in the current simulcast group associated with that selected UE are border radio points located outside of the current zone for that selected UE using a quantized signature vector for that UE.

12. The system of claim 1, wherein the baseband controller cluster is communicatively coupled to the radio points using a switched ETHERNET network.

13. A method of providing wireless service using a baseband controller cluster and a plurality of radio points, wherein the baseband controller cluster and the plurality of radio points implement a base station to provide wireless service to a plurality of user equipment (UEs) using a common cell, wherein the baseband controller cluster is communicatively coupled to a core network of a wireless service provider, the baseband controller cluster comprising a plurality of baseband controllers, wherein the radio points are configured to transmit and receive radio frequency signals to and from the UEs, each of the radio points associated with at least one antenna and remotely located from the baseband controller cluster, wherein the plurality of radio points is communicatively coupled to the baseband controller cluster; and where the common cell is divided into a plurality of zones, the method comprising:
associating each of the zones with a respective one of the baseband controllers;
designating one of the baseband controllers as a cell manager for the cell;
for each UE served by the cell, assigning one of the baseband controllers to serve as a home controller for that UE, wherein the home controller for each UE does not change as the UE moves throughout the cell;
hosting by the cell manager, for each UE served by the cell, a respective control-plane connection with a core network;
communicating control-plane messages for each UE between the core network and the home controller for that UE via the cell manager;
hosting by each home controller a respective user-plane connection with the core network for each UE that the home controller serves as the home controller for;
communicating user-plane messages for each UE between the core network and the home controller for that UE over the respective user-plane connection;
for each current transmission time interval (TTI):
selecting some of the UEs served by the cell to schedule during a current transmission time interval (TTI);
classifying each selected UE into one of the zones as a current zone in which that selected UE is currently located;
selecting the baseband controller assigned to the current zone of that selected UE to serve as a scheduling controller for that scheduled UE;
determining, for each selected UE, which radio points in the current simulcast group associated with that selected UE are border radio points located outside of the current zone for that selected UE;
for each border radio point, determining a split of radio resources of the current TTI for that radio point among the scheduling controllers for the selected UEs that have that border radio point in the current simulcast groups for those selected UEs; and independently allocating, by each scheduling controller, radio resources to the selected UEs for which that scheduling controller serves as the scheduling controller while respecting any splits of radio resources that apply to that scheduling controller.

14. The method of claim 13, wherein the cell manager is configured to, in response to a connection request from a UE, assign one of the baseband controllers to serve as the home controller for that UE based on the zone in which the UE is located.

15. The method of claim 14, wherein which zone a UE is located in is determined based on a quantized signature vector determined for that UE.

16. The method of claim 13, wherein the cell manager is configured to, in response to a handover request in connection with a UE being handed-in to the cell, assign one of the baseband controllers to serve as the home controller for that UE using a load-balancing algorithm.

17. The method of claim 13, wherein uplink traffic sent on a Physical Random Access Channel (PRACH) is communicated to the cell manager.

18. The method of claim 13, wherein each control-plane connection is made with a mobility management entity (MME) of the core network.

19. The method of claim 13, wherein each user-plane connection is made with a Service Gateway (SGW) of the core network.

20. The method of claim 13, wherein the cell manager implements a radio resource management (RRM) function that performs RRM processing for all of the UEs served by that cell.

21. The method of claim 13, wherein each baseband controller implements radio resource controller (RRC) function that performs RRC processing for any UEs homed to that baseband controller.

22. The method of claim 13, wherein classifying each selected UE for the current TTI into one of the zones as the current zone in which that selected UE is currently located using a quantized signature vector for the selected UE.

23. The method of claim 13, wherein determining, for each selected UE, which radio points in the current simulcast group associated with that selected UE are border radio points located outside of the current zone for that selected UE is done using a quantized signature vector for that UE.

24. The method of claim 13, wherein the baseband controller cluster is communicatively coupled to the radio points using a switched ETHERNET network.

* * * * *